Figure 1:
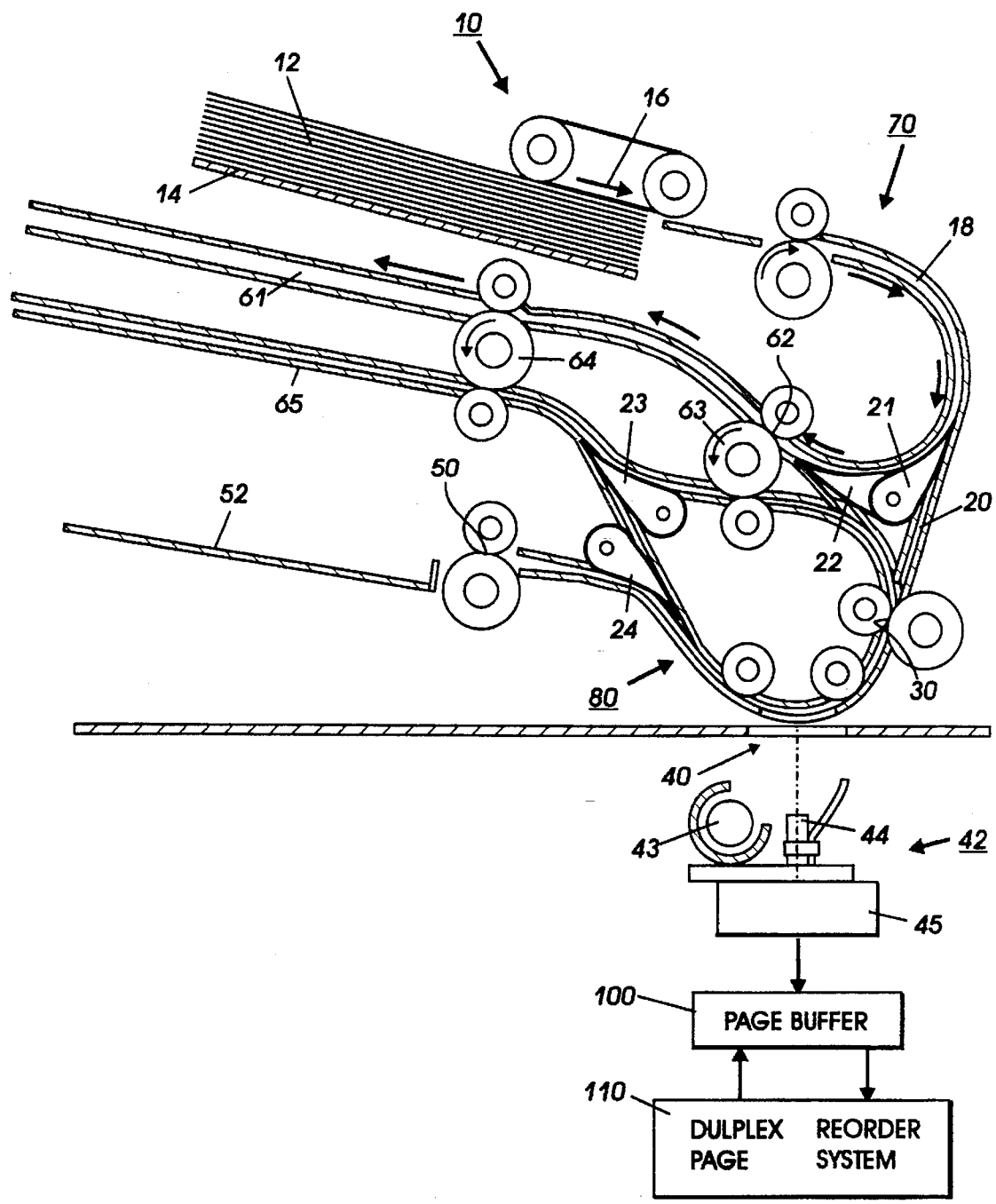

United States Patent [19]

Rubscha

[11] Patent Number: 5,669,056
[45] Date of Patent: Sep. 16, 1997

[54] DUPLEX DOCUMENT HANDLING SYSTEM

[76] Inventor: Robert F. Rubscha, 21 S. Gate, Fairport, N.Y. 14450

[21] Appl. No.: 620,819

[22] Filed: Mar. 25, 1996

[51] Int. Cl.$^6$ .................................................. G03G 15/00
[52] U.S. Cl. .......................................... 399/367; 399/374
[58] Field of Search .................................. 355/318, 319, 355/320, 308, 309, 321, 322; 271/291, 186; 399/361, 365, 367, 372, 374

[56] References Cited

U.S. PATENT DOCUMENTS

| | | |
|---|---|---|
| 4,419,007 | 12/1983 | Kingsley . |
| 4,456,236 | 6/1984 | Buddendeck ..................... 271/291 X |
| 4,496,984 | 1/1985 | Stoffel ................................ 358/293 |
| 4,536,077 | 8/1985 | Stoffel . |
| 4,743,974 | 5/1988 | Lockwood ......................... 358/285 |
| 5,203,554 | 4/1993 | Suzuki et al. ...................... 271/291 X |
| 5,343,281 | 8/1994 | Yamada . |
| 5,430,536 | 7/1995 | Fullerton et al. . |
| 5,463,451 | 10/1995 | Acquaviva et al. . |
| 5,486,911 | 1/1996 | Rubscha et al. . |

FOREIGN PATENT DOCUMENTS

| 62-6272 | 1/1987 | Japan .................................... 355/320 |
|---|---|---|

OTHER PUBLICATIONS

Xerox Disclosure Journal vol. 19, No. 1, Jan./Feb., 1994, pp. 27–28 By: Fullerton, et al.

Xerox Disclosure Journal vol. 16, No. 5, Sep./Oct. 1991 pp. 287–291 By: Thomas, Ferreva & Roller.

*Primary Examiner*—Sandra L. Brase

[57] ABSTRACT

In an automatic document handling system for sequentially feeding a set of multiple duplex or simplex document sheets from an input tray to a single digital electronic imaging station and restacking the sheets in collated order in an output tray, including a system for inverting duplex documents between imagings of their opposite sides, for imaging both sides of the duplex documents at the same imaging station, there are upper and lower superposed inversion loop document sheet feeding paths, the upper path providing pre-inversion of one duplex sheet prior to feeding the sheet to the imaging station, while the lower inversion loop path concurrently provides imaging and inversion of another duplex sheet therein, to increase the effective duplex documents imaging rate.

3 Claims, 4 Drawing Sheets

DUPLEX DOCUMENT HANDLING SYSTEM

Disclosed in the embodiment herein is an improvement in automatic duplex documents sheet handling and imaging systems for increasing the effective imaging, scanning or copying rate for both sides of sets of duplex documents with a novel sequential sheet feeding path system for the duplex documents. The disclosed sheet feeding path system provides for inverting one duplex document sheet while another is being imaged, to increase the effective rate of duplex documents imaging. Yet, the disclosed sheet feeding path system is also fully compatible with and efficient for sequentially feeding and imaging simplex document sheets. It also maintains proper document order and collation for the outputting and restacking in a single output tray of all the document sheets after their imaging, whether duplex or simplex.

By way of background, of particular interest are prior art automatic document handlers for automatically sequentially feeding and imaging a set or job of plural duplex (two sided) document sheets, which document handlers are also capable of compatibly feeding and copying simplex documents (having images on only one side of the sheet). (Documents to be copied are sometimes referred to as "originals" even though they may be copies themselves.) In particular, such prior art automatic document feeders which are particularly suited for imaging the documents electronically (digitally) while the document is moved past such an imaging station (comprising a narrow transverse imager array) with a constant velocity transport (CVT), which allows for a more compact and faster imaging document handler as compared to document handlers which place the document on a full size platen and hold the document stationary while it is scanned by a moving scanner. However, the latter may also be compatibly provided as an additional option. Some examples of such document handlers, containing discussions of their advantages and disadvantages, are in the following Xerox Corporation U.S. Pat. Nos., and other art cited therein: 5,430,536, issued Jul. 4, 1995 to Jack K. Fullerton and Michele D. Taber, et al; 5,486,911 issued Jan. 23, 1996 to Robert F. Rubscha, et al; 5,463,451 issued Oct. 31, 1995 to Thomas Acquaviva and Paul F. Morgan, et al; 4,496,984 issued Jan. 29, 1995 and 4,536,077 issued Aug. 20, 1985, both to James C. Stoffel; and 4,743,974 issued May 10, 1988 to Dan F. Lockwood. Likewise, Xerox Disclosure Journal (XDJ) publication Vol. 19, No. 1, January/February, 1994, pages 27–28, to Jack K. Fullerton, et al.. Although said XDJ publication specifically notes that when operating in duplex mode the original sheets are first inverted before reaching the CVT 8 using gated upper loop 15 in order to copy the backside of the original sheets first, the original is inverted again by feeding it through a second pass of the same upper loop 15. It is also important to note that two separate exit trays are required in this XDJ disclosed system; output tray 12 for simplex originals, and output tray 18 for duplex documents, which is obviously undesirable, both in terms of space and operator confusion, as compared to providing a single output tray for all document sheets being imaged.

Merely by way of further background of electronic digital document scanning and imaging in general, the following are some examples of Xerox Corporation U.S. Pat. Nos. thereon: 4,287,536; 4,295,167; 4,380,389; 4,471,386; 4,451,030; 4,447,830; 4,506,301;4,607,951; and 5,026,044. Of further background interest with regard to duplex document handlers for copiers in which the documents are optically imaged on a platen, there is noted Xerox Disclosure Journal Vol. 16, No. 5, September/October, 1991, pages 287–291; and Vol. 17, No. 1, January/February, 1992, pages 25–26; and Xerox Corporation U.S. Pat. Nos. 4,459,013; 4,278,344; 4,234,180; 4,330,197; 4,384,782; 4,355,880; 4,553,828; 4,536,078; and 4,456,236.

A particular difficulty in duplex document handling for electronic imaging is in desirably only requiring one such electronic imaging station. However, that requires inverting or turning over each duplex document after imaging one side thereof in order to image the other side of the duplex document, and reorienting the documents for collated restacking. As discussed in the above-cited U.S. Pat. No. 5,430,536, etc., that may require several time delays in which no document side (page) imaging is being accomplished, thus effectively reducing the effective imaging or duplex document copying rate of the overall system. As provided by the disclosed system herein, it is desirable to improve productivity or throughput rate for electronic document scanners in which the automatic document feeder can eliminate many of these nonscanning periods, or "skipped pitches" as they are sometimes called, in copying duplex documents. The disclosed document handling system can scan one document while at the same time inverting another. In fact, in the disclosed embodiment, the system can invert two duplex sheets at the same time with the same drive system, using the same drive motor and drive rollers.

As indicated above, this problem of efficiently scanning duplex documents is exacerbated by the additional requirement that one must normally invert the document twice in its overall path through the system in order to return the document sheet to the exit tray to restack in the original order and be properly collated. As is well known, if documents are fed in forward serial order (1 to N page order) and are sequentially stacked on top of one another as they exit the system, regardless of whether the output tray is a separate tray or the original input tray, the document sheets must be stacked "face down" in order to remain collated and in proper order when fed in such forward or 1 to N page order. Otherwise, the sheets must be undesirably manually reordered after their imaging. Another practical design constraint is that although N to 1 or reverse page order imaging is known, it is undesirable for several reasons, as taught in the prior art, including delaying facsimile or printing until the entire job set has been scanned in, and/or requiring precounting of the number of simplex sheets for properly collated duplex copying from simplex originals. It is also impractical to design document feeders which would feed simplex documents 1 to N and duplex documents N to 1, or vice versa.

It is also desirable to have the input tray overly the output tray of a document handler. This provides a more compact overall configuration, and also allows the document inversion path to be compactly interposed between the overlying upper and lower trays, using the space therebetween, as specifically covered in the above-cited U.S. Pat. No. 5,430,536. However, this desirable configuration with the input tray over the output tray results in a natural sheet path inversion as a sheet is fed out from the input tray down and around into the output tray. That is fine for simplex documents, since they then restack face down and collated if they are fed from the top of a face up stack in the input tray. However, this poses a problem for duplex documents, where the duplex documents must be inverted a second time between the imaging of one side and the imaging of the other side of the duplex document. A third inversion of the duplex document is then required in order to allow the duplex document to be restacked properly collated in the output tray. This third inversion causes a productivity loss, especially where the inversion is done utilizing the path through the imaging station, preventing the imaging of any document in that time period.

The present embodiment of a document handler sheet feeding and imaging is in contrast to typical prior art duplex document feeding and scanning sequences. The following are two examples of such prior art systems sequences:

1. (a) feed sheet one and image scan side one of sheet one, (b) wait to invert sheet one, (c) image scan side two of sheet one, (d) wait to invert sheet one again, and then (e) feed sheet one to the exit tray, before or after feeding sheet two for the same treatment.

2. (a) feed sheet one and wait to invert it, (b) scan side two of sheet one, (c) wait to invert it, (d) scan side one of sheet one, and (e) feed sheet one to the exit tray. This process is repeated for each sheet that follows.

Either process 1 or 2 above takes much more time for imaging a set of duplex documents than a set of simplex documents, due to considerable time delays for the document inversions, and therefore represents a productivity shortfall.

In contrast, the present system and method allows productivity to more closely approach the rate at which scanning impressions of the duplex document sides can be made as rapidly in sequence as for simplex documents. In the embodiment herein, with the exception of one brief initial delay for the first duplex document sheet fed into the system, the delay between duplex document sheets imagings can be eliminated. In the disclosed system a separate pre-inversion paper path in the document handler allows the second and every subsequent document sheet thereafter to be in the process of being inverted while the preceding duplex document sheet is being inverted a second time and scanned, and the second sheet can start imaging almost immediately after the first sheet is finished scanning its second side.

As may be seen from the disclosed embodiment, these and other features are provided in this example by a simple and compact document handling system. In fact, as shown, the same drive motor and drive rollers can be used simply by adding a set of idler nip rollers to the other side of a reversing drive roller to create a reversing tri-roller system, and adding an additional paper path merely by adding some additional low cost baffles. Furthermore, simplex documents are not required to go through or be delayed or impacted by the additional duplex document handling path features here.

A specific feature of the specific embodiments disclosed herein is to provide an automatic document handling system for automatically sequentially feeding a set of multiple duplex and simplex document sheets from an input tray to be imaged at a single digital electronic imaging station and converted to electronic page images and then restacking the document sheets in correct collated order in an output tray, including a duplex document inverting system for inverting duplex documents between imagings of the opposite sides thereof, for imaging both sides of the duplex documents at said imaging station, comprising upper and lower independent superposed inversion loop document sheet feeding paths, said upper inversion loop path providing pre-inversion of a duplex document sheet fed from said input tray prior to feeding the duplex document sheet to said imaging station, and said lower inversion loop path providing inversion of another said duplex document sheet therein between said imagings of the opposite sides thereof, concurrently with said pre-inversion of the other duplex document sheet in said upper inversion loop, to increase the effective imaging rate of the duplex document sheets.

Further specific features disclosed herein, individually or in combination, include those wherein a sheet bypass system for bypassing said upper inversion loop path is provided for feeding of the simplex documents to be imaged and restacked in said same output tray in correct collated order; and/or wherein two duplex document sheets are inverted at the same time using the same drive motor for the sheet feeding paths; and/or wherein said duplex documents are fed in forward serial order from said input tray; and/or wherein the second sides of the set of multiple duplex documents are imaged before their first sides, rather than in forward serial page order; and/or further including a system for electronic duplex page reordering of said electronic page images into forward serial order.

The disclosed system may be operated and controlled by appropriate operation of conventional control systems. It is well known and preferable to program and execute imaging, printing, paper handling, and other control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs.

It is well known that the control of document and copy sheet handling systems may be accomplished by conventionally actuating them with signals from a microprocessor controller directly or indirectly in response to simple programmed commands, and/or from selected actuation or non-actuation of conventional switch inputs such as switches selecting the number of copies to be made in that job or run, selecting simplex or duplex copying, selecting a copy sheet supply tray, etc.. The resultant controller signals may conventionally actuate various conventional electrical solenoid or cam-controlled sheet deflector fingers, motors or clutches, or other components. Conventional sheet path sensors or switches connected to the controller may be utilized for sensing, counting, and timing the positions of sheets in the sheet paths of the reproduction apparatus, and thereby also controlling the operation of sheet feeders and inverters, etc., as is well known in the art.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Figure 2:
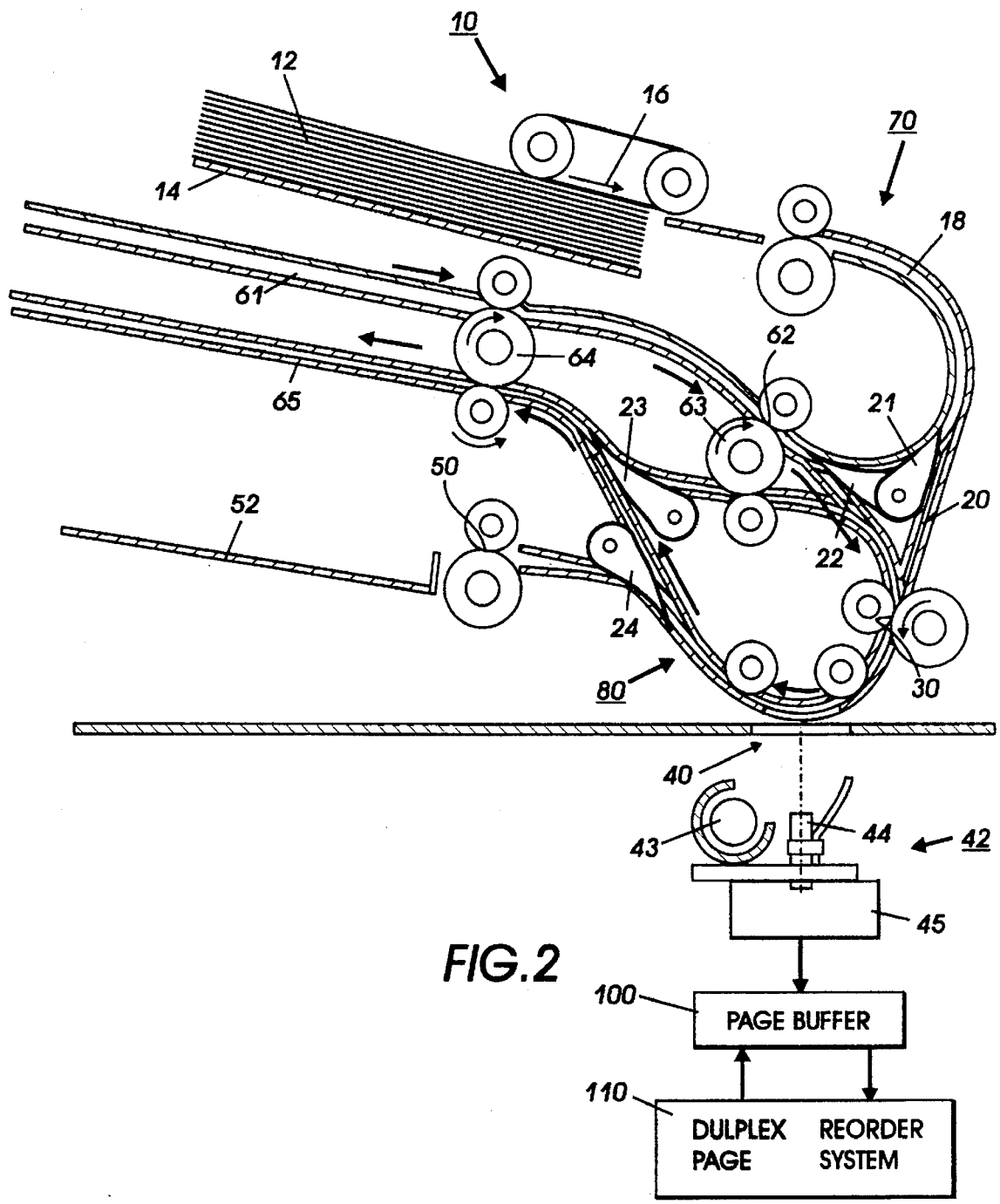
Figure 3:
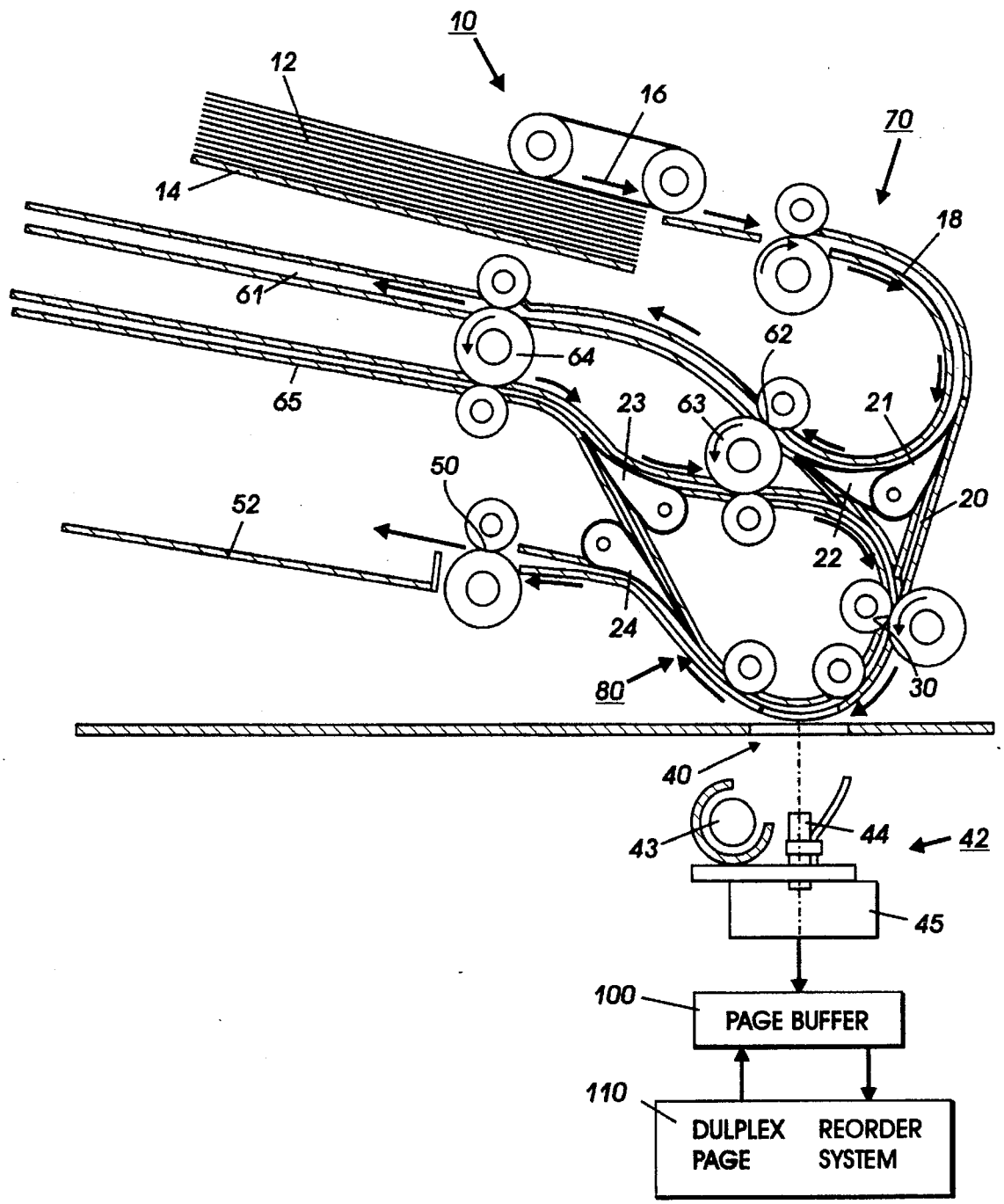
Figure 4:
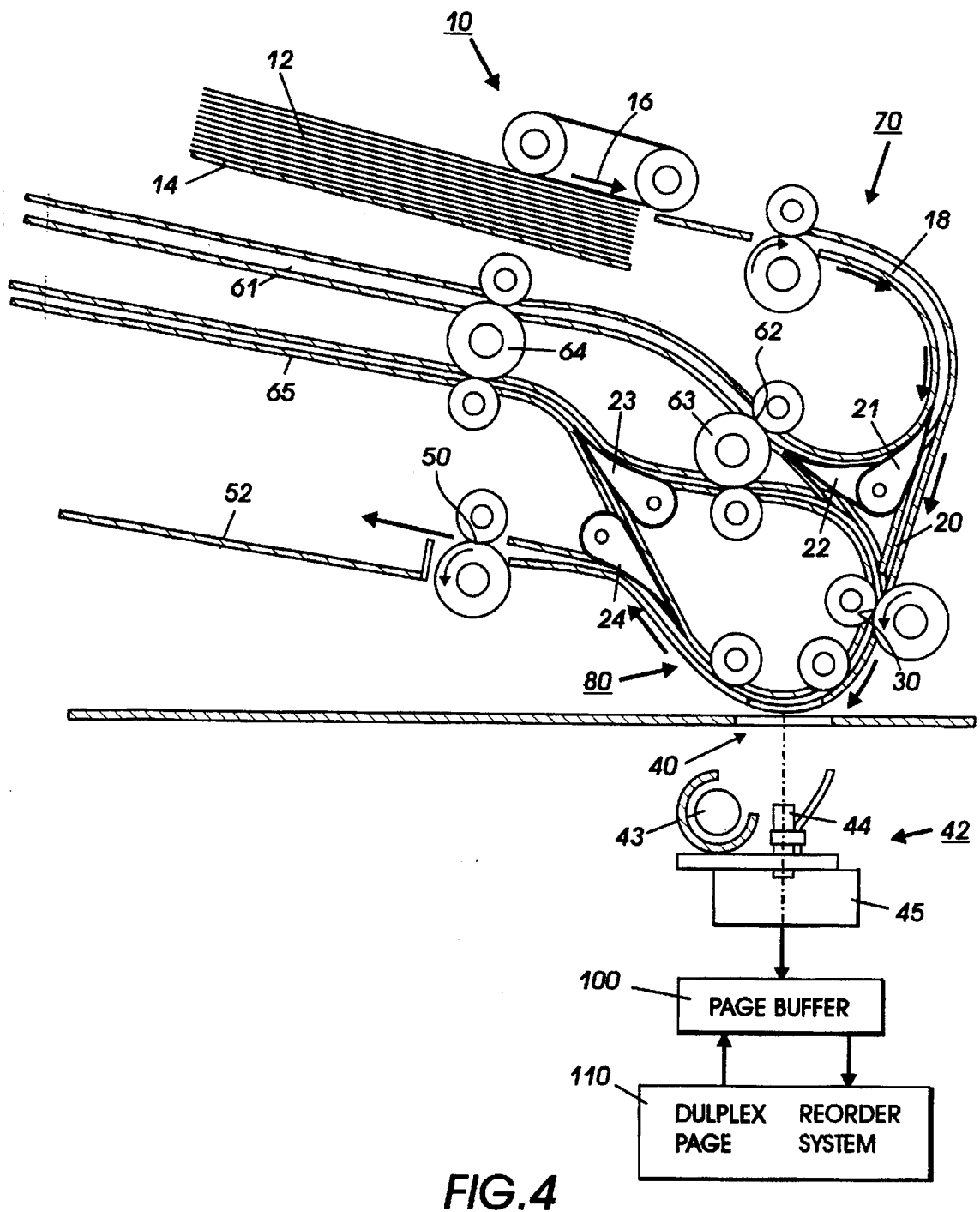

Various of the above-mentioned and further features and advantages will be apparent from the specific apparatus and its operation described in the example below, and the claims. Thus, the present invention will be better understood from this description of a specific embodiment, including the drawing figures (approximately to scale) wherein:

FIGS. 1, 2, 3, and 4 are identical frontal schematic views of the same duplex and simplex document handling and imaging system, shown in respective different sequential operating positions for feeding and imaging duplex documents in FIGS. 1–3, and shown in its simplex document handling mode of operation in FIG. 4.

Referring now to the specific exemplary embodiment shown in the figures, it will be appreciated that many variations and modifications thereof are within the skill of those in the art. Merely as one example, there is an alternative form of sheet inverter in which two document sheets may be handled in the same inverter at one time, with one document feeding in at the same time that another document is being fed out, as is taught in Xerox Corporation U.S. Pat. No. 4,214,740 issued Jul. 29, 1980 to Thomas Acquaviva. That is, a sheet reversal system in which the entering sheet may be fed into the inverter chute simultaneously with or overlapping with the exit from the same inverter chute of the previous sheet, rather than having two separate sheet inverter chutes.

Referring now to the function, operation and structure of this exemplary document handling unit 10, it should be initially noted that in this disclosed embodiment, what may appear to be conventional tri-roller sheet inverters are not. The drives therefor are reversible and reverse during the operations of duplex document handling, and provide positive sheet feeding nip acquisition and control over the sheets. That is in contrast to a conventional tri-roller inverter which is fully releasing one end of the sheet from one of the two nips of the tri-roll inverter and then recapturing the end of the sheet in the other nip of the same tri-roller inverter for exiting the sheet from the inverter chute.

The compatible copying of simplex (one sided) originals, as shown in FIG. 4, will be described first. The set of documents 12 are desirably loaded face up in an easily accessible top tray 14 of this document handling system unit 10. Thus, the documents feed in forward or 1 to N page order by the conventional top feeder 16 into the document input path 18. The documents here in this FIG. 4 simplex document mode of operation pass by the first gate 21 of the four document deflector gates 21, 22, 23, and 24. For such simplex documents this gate 21 is not actuated and therefore the simplex documents continue through the input path 18 straight through a simplex path 20 on to the registration and feed rolls nip 30. Note that gate 21 is an active gate, conventionally operated by a solenoid, clutch, or the like, as is gate 24, whereas gates 22 and 23 here may be simple passive or gravity gates.

Once a document sheet is acquired in the nip 30 of the registration rolls, it is driven forward into the imaging station 40, here with the assistance of the two rolls on opposite sides thereof in the document path. At this point, the document sheet has also been inverted due to a 90 degree turn in the initial sheet input path 18 and a further 90 degree inversion in the document path between the registration rolls 30 and the imaging station 40. Thus, the simplex document is now properly face down in the imaging station 40, facing the imager 42. This imager 42 here is conventional, comprising a document illuminator 43, selfoc™ lens 44, and digitizing electro-optical conversion device 45 converting the light image from the document to electrical pixel signals in sequential line scans as the document is fed at a constant velocity past the imaging station 40, all of which is well-known per se and need not be described herein. (This scanner 42 may also, optionally, as shown in above-cited art such as U.S. Pat. No. 5,430,536, be laterally movable away from the imaging station 40 to scan under an adjacent larger area platen for stationery document copying thereon.)

After the simplex document passes through the imaging station 40, as shown by the further document movement arrows in FIG. 4, it directly exits under the raised exit or duplex gate 24 to the exit rollers nip 50 and output tray 52 for stacking face down. Therefore, as the subsequent simplex documents stack on top of the preceding documents in output tray 52 (which is compactly underlying the input tray 14) they will be in the same properly collated order as they were originally. Note that with this system, for simplex documents there are no sharply arcuate or small radius sheet path bends, and only two separated turns of approximately 90 degrees each, which is very desirable for reducing sheet feeding jams.

Turning now to a description of the operation of the same document handling unit 10 for duplex documents, they are loaded in the same tray 14 and fed to the same feeder 16 in the same manner into the same input path 18. However, as shown by the respective movement arrows in FIGS. 1, 2, and 3, the operation and feeding is different for duplex documents thereafter. As shown in FIG. 1, the gate 21 is initially activated and therefore the duplex document is deflected into a pre-invert duplex paper path 61, and pushes down passive gate 22 to enter the upper nip 62 of the reversible tri-roll unit 63 then being driven counterclockwise by the central drive roller thereof, as shown by its rotation arrow at this point. As the duplex sheet continues down this pre-invert path 61, it reaches a second reversible tri-roller unit 64 and feeds through its upper nip into the continuation of path 61 beyond that nip here.

Referring now to FIG. 2, after the trail edge of the duplex document sheet has passed the passive gate 22, that gate lifts automatically, and both of the tri-roll inverter units 63 and 64 are reversed in their driving direction, as shown by the rotational arrows thereon in FIG. 2. This causes that sheet to reverse direction and feed back out of the pre-invert path 61 under the gate 22 into a short connecting path to the registration roller nip 30, which feeds the sheet on for imaging the reverse or page 2 side of this first duplex document sheet at the imaging station 40.

As shown by the movement arrows in FIG. 2, after the first (side 2) imaging of the duplex document, that document is fed into a second inverting path 65 by gate 24 being lowered at this point, to feed the document into the second inverting path 65 through the lower nip of the same tri-roller unit 64.

Meanwhile, as shown in FIG. 3, the second or other succeeding duplex document sheet has been fed from the tray 14 through the input path 18 and pro-inverting path 61, as shown by the movement arrows. The first duplex document sheet is now fed out of the second invading chute 65, over the top of gate 23, through the lower nip of the tri-roller unit 63, back into the registration rolls 30. At this point it is inverted or turned over again, since the path of the duplex document from the imaging station 40 to the second reversing chute 65 and back is a 360 degree arcuate inversion path. Thus, the opposite side (page 1) of that duplex document may now be imaged at the imaging station 40, and this document, having now been copied on both sides and invaded twice, can be exited by lifting the gate 24 to feed that document out through exit nip 50 to restack in exit tray 52, in its original orientation, with proper collation.

Note that side one (page 1) of sheet one was scanned in the second pass of sheet one. As sheet one is exiting, the subsequent duplex document sheet will have already been invaded at this point in time and is being fed out by the upper nip 62 of triroller unit 63 to the registration rollers 30 for feeding on to the imaging station 40 directly following the trailing edge of the preceding sheet one through the imaging station 40. Therefore, with this exemplary system 10, there is no wasted non-scanning time delay between imaging pages of the successive duplex document sheets.

Note that with this unit 10, there are in effect two separate but superposed U-shaped document paths 70 and 80, in which the first or upper U-shaped invading path 70 is separate from the imaging path and is used for pre-inverting documents simultaneously or concurrently with the lower imaging and inverting path 80. The lower inverting path loop 80 includes the imaging station 40 and the separate inverter chute 65. Yet, it may also be seen that there are common shared drives 63 and 64, each of which is driving opposing idlers in the respective paths 61 and 65 in opposite directions at the same time to accomplish the desired opposite direction movements of the two sheets simultaneously in the two different paths with minimal additional hardware requirements.

It may be seen with the present system there may be a slight delay between the imaging of the first and second sides of a duplex document sheet. That is, the time between the trail edge of the duplex document clearing the imaging station 40 and its lead edge returning from the second inverter 65 back to the imaging station 40 through the lower inversion loop path 80. However, with the present system there is no delay between the end of the imaging of the second side to be imaged of a duplex document sheet and the beginning of imaging of one side of the next duplex document sheet, because the next duplex document sheet can directly follow the first sheet into the imaging station without delay by being simultaneously fed out of the first, independent, inversion path 61 to the imaging station 40. To express this another way, only every other (alternate) page which is scanned of the duplex documents needs any significant time delay between page scanning in this system.

Furthermore, there are no non-scanning or slew feeds of any document through the imaging station 40 with this system at any time. Here, there is no imaging delay for a third inversion of a duplex document sheet, because here the third inversion of each duplex document sheet occurs on the second imaging pass of that document sheet through the imaging station 40. That is, unlike prior systems such as that described in said U.S. Pat. No. 5,430,536, here the duplex document does not have to be refed through the imaging station 40 in a non-imaging or slew cycle after its second pass (second side) imaging.

Note that in the present system, since the duplex documents are imaged first on their second side, and then imaged after that on their first side, that the conventional electronic page image buffer 100, connected to the scanner output 45 for storing electronic page images, is provided with an operatively connecting duplex page reordering system 110 which simply switches the alternating pages order of the duplex document page images in the page buffer 100 so that they are in collated order in the page buffer 100 and/or its output. That is, although the duplex documents are copied here in the page sequence 2, 1; 4, 3; 6, 5; etc., before these page images are actually utilized (such as by being sent to a printer for printing, faxing, or the like), they are automatically reordered in normal forward serial page order; 1, 2, 3, 4, 5, 6, etc. Thus, while the second sides of a set of multiple duplex documents are imaged before the first sides of those duplex documents here, and thus are initially received by the page buffer 100 initially out of normal forward serial order, the duplex page reordering system 110 automatically reorders these electronic page images into normal forward serial order. Software and/or separate page buffers for reordering pages are well known per se in prior art electronic document handling systems, and need not be described in detail herein. Some additional examples are in Xerox Corporation U.S. Pat. No. 5,271,065 and Eastman Kodak Corp. U.S. Pat. No. 5,105,283.

Alternatively, for copying or printing, duplex copy sheets could alternately be printed in the same page order as the duplex documents are imaged here, printing their second or even side in a first printing pass and these copy sheets could be appropriately output path inverted for collated stacking after their second printing pass, in which their first or odd page sides would be printed in this alternative.

While the embodiment disclosed herein is preferred, it will be appreciated from this teaching that various alternatives, modifications, variations or improvements therein may be made by those skilled in the art, which are intended to be encompassed by the following claims:

I claim:

1. An automatic document handling system for automatically sequentially feeding a set of multiple duplex and simplex document sheets from an input tray to be imaged at a single digital electronic imaging station and converted to electronic page images and then restacking the document sheets in correct collated order in an output tray, including a duplex document inverting system for inverting duplex documents between imagings of the opposite sides thereof, for imaging both sides of the duplex documents at said imaging station, the improvement comprising:

upper and lower independent superposed inversion loop document sheet feeding paths, said upper inversion loop path providing pre-inversion of a duplex document sheet fed from said input tray prior to feeding the duplex document sheet to said imaging station, and said lower inversion loop path providing inversion of another said duplex document sheet therein between said imagings of the opposite sides thereof, concurrently with said pre-inversion of the other duplex document sheet in said upper inversion loop, to increase the effective imaging rate of the duplex document sheets;

wherein a sheet bypass system for bypassing said upper inversion loop path is provided for feeding of the simplex documents to be imaged and restacked in said same output tray in correct collated order.

2. An automatic document handling system for automatically sequentially feeding a set of multiple duplex and simplex document sheets from an input tray to be imaged at a single digital electronic imaging station and converted to electronic page images and then restacking the document sheets in correct collated order in an output tray, including a duplex document inverting system for inverting duplex documents between imagings of the opposite sides thereof, for imaging both sides of the duplex documents at said imaging station, the improvement comprising:

upper and lower independent superposed inversion loop document sheet feeding paths, said upper inversion loop path providing pre-inversion of a duplex document sheet fed from said input tray prior to feeding the duplex document sheet to said imaging station, and said lower inversion loop path providing inversion of another said duplex document sheet therein between said imagings of the opposite sides thereof, concurrently with said pre-inversion of the other duplex document sheet in said upper inversion loop, to increase the effective imaging rate of the duplex document sheets;

wherein said duplex documents are fed in forward serial order from said input tray, and wherein the second sides of the set of multiple duplex documents are imaged before their first sides, rather than in forward serial page order.

3. The automatic document handling system of claim 2, further including a system for electronic duplex page reordering of said electronic page images into forward serial page order.

* * * * *

UNITED STATES PATENT AND TRADEMARK OFFICE
CERTIFICATE OF CORRECTION

PATENT NO. : 5,669,056
DATED : September 16, 1997
INVENTOR(S) : Robert F. Rubscha It is certified that error appears in the above-indentified patent and that said Letters Patent is hereby corrected as shown below:

Title page, item [73], Assignee: insert--Xerox Corporation, Stamford, CT".

Signed and Sealed this

Thirtieth Day of June, 1998

Attest:

BRUCE LEHMAN

Attesting Officer    Commissioner of Patents and Trademarks